INVENTOR:
Johann SOHNS

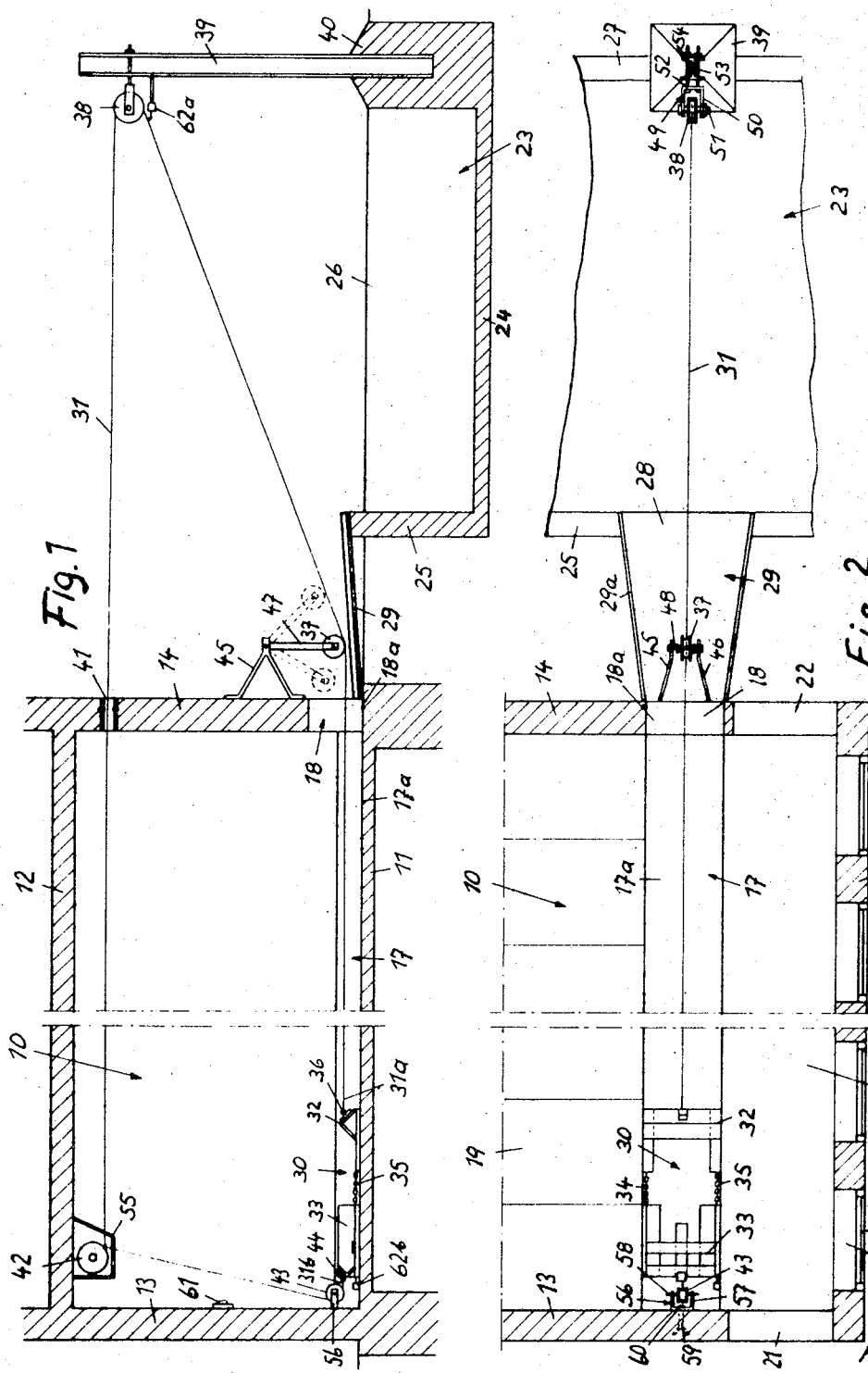

BY
Mason,
Fenwick & Lawrence
his ATTORNEYS

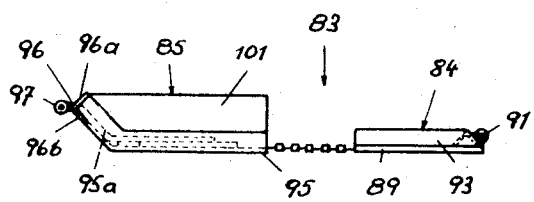
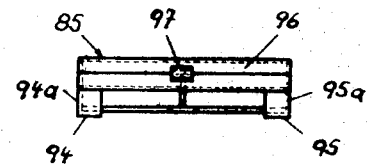
Fig. 9     Fig. 10
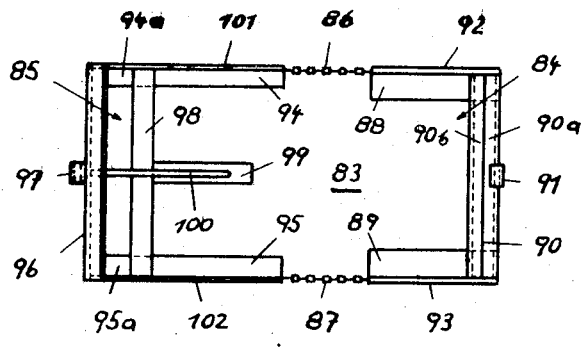
Fig. 11

3,717,242
MANURE REMOVAL SYSTEM
Johann Sohns, 77 Habscheider Weg, Brandscheid, near Prüm, Germany
Filed Nov. 4, 1970, Ser. No. 86,847
Claims priority, application Germany, Nov. 11, 1969,
P 19 56 624.6; May 22, 1970, G 70 19 117.2
Int. Cl. B65g 25/08
U.S. Cl. 198—224                         17 Claims

ABSTRACT OF THE DISCLOSURE

A manure removal plant or system for a shed, stable or the like for animals, with a manure gutter in the shed and a dung yard adjacent the shed. A dung removal carriage is movable along the gutter and thence out and obliquely over the dung yard. The carriage is also movable in the other or reverse direction over the dung yard and back along the gutter. The system further includes a haulage cable, connected to the carriage at oppositely spaced locations thereon and also include guiding pulleys for guiding the movement of the cable and carriage, and reversible drive means. The cable connections on the carriage at the spaced locations define between them a longitudinal carriage axis and each is disposed at such a height that the connecting line therebetween is slightly above the center of gravity on the carriage whereby the dung-laden carriage when suspended over the dung yard is capable of performing automatically complete self-discharging rotations about the longitudinal axis.

FIELD OF THE INVENTION

The invention relates to a manure removal plant or system with a dung removal carriage of low profile and which is of basically generally planar form, whether in single or multiple section, and primarily utilizing the major plane thereof to support said dung. The system further embodies a carriage slidable along the manure gutter of the stable and a cable to haul the dung removal carriage and guide it by means of jockey pulleys through the stable and over a dung yard adjacent thereto, being driven back and forth by a reversible driving motor, the two ends of the haulage cable being secured to the front and rear of the dung removal carriage which is adapted to be hauled back and forth by the said cable.

DESCRIPTION OF THE PRIOR ART

In the case of prior art manure removal plants of this kind, the haulage cable for their dung removal carriages, on leaving the exit from the stable, extends substantially at a constant height over the dung yard. For emptying of the dung removal carriage, in the case of prior art plants, this latter is in most cases moved only as far as the edge of the dung yard or directly over dung already present in the dung yard, and is then conveyed back to the stable. During all its movements, the dung removal carriage is always in a substantially horizontal position.

Consequently, the prior art manure removal plants have the disadvantage that the dung is not always completely discharged onto the yard. Furthermore, a disadvantage with the prior art manure removal plants is that they allow the yard only to be filled to a relatively low height with dung.

However, one manure removal plant of the type in question is already known in which the haulage cable is guided from the region of the manure gutter obliquely upwardly over the dung yard, its two ends being secured to the front and rear of the dung removal carriage, above the centre of gravity thereof. The dung removal carriage of this manure removal plant has a rectangular upper frame, to the front and rear transverse parts of which the haulage cable is connected. Furthermore, the dung removal carriage of this plant has a dung bucket located beneath its frame and open at the front end and having a bottom wall, two side walls and a rear wall. The rear wall of the dung bucket is articulatingly connected to the rear part of the frame by means of lateral joint elements. The front end of the dung bucket is so constructed that it can be brought into and out of form-locking engagement with the front cross part of the frame.

When the prior art manure removal plant in question is used, the carriage loaded with dung is moved by means of the haulage cable obliquely upwardly over the dung yard. By reason of the low position of the centre of gravity of the dung removal carriage in relation to the haulage cable, therein, only small pendulum movements of the dung removal carriage are possibly carried out with reference to the haulage cable axis. In order to ensure that the dung located in the carriage is discharged therefrom, it is necessary for the front end of the dung bucket to be disengaged from the front cross part of the frame, for which a special release device is provided. After the dung bucket has been released, the forward end of the bucket tilts downwardly into a vertical position, so that the dung located in the carriage can drop out and onto the dung yard.

The manure removal plant which has just been described, however, has the substantial disadvantage that, with regard to its construction and mode of operation, it leaves much to be desired in terms of simplicity and, moreover, is also very susceptible to breakdown. The reason for this lies particularly in the fact that, where the prior art manure removal plant is concerned, its dung carriage has a bucket articulated on a frame, discharge of the carriage involving the front end of the bucket having to be tilted downwardly, so that a particular actuating device is required, the bucket having to be moved back into and locked in its starting position in order to be filled.

The invention is based on the problem of providing a manure removal plant of the type in question, which is characterised by a particularly simple construction and mode of operation, being hardly susceptible to breakdown and yet always permitting of complete discharging of the dung removal carriage and filling of the dung yard up to a relatively considerable level.

SUMMARY OF THE INVENTION

In order to resolve this problem, the invention envisages a manure removal plant or system in which the two ends of the haulage cable are secured to the dung removal carriage at such a height that, when this is filled above the center of gravity, the said carriage automatically executes complete rotary movements about the longitudinal axis extending through the points of attachment of the haulage cable.

In this construction and mode of operation, the new manure removal plant is very simple and hardly likely to breakdown because its dung removal carriage has no moving parts of any kind which, for discharging of the carriage, have to be tipped downwardly and returned to the starting position for a further filling. In the case of the new manure removal plant, namely, by reason of its construction, the dung removal carriage is emptied in that, when it is filled, and is located over the dung yard, it automatically executes complete rotary movements about the longitudinal axis extending through the points of attachment of the haulage cable. Furthermore, by reason of the construction of the new manure removal plant, the carriage automatically returns to its starting position after being emptied.

The new manure removal plant also permits of complete emptying of the dung removal carriage always, and ensures that the dung yard is filled up to a relatively high level. The complete discharging of the dung removal carriage is achieved by the rotary movements which the carriage performs over the dung yard, while the filling of the dung yard up to a relatively high level is based on the fact that, adjacent to the exit of the animal shed or stable, the haulage cable extends from the region of the manure gutter obliquely upwardly and over the dung yard.

In the case of the new manure removal plant, the invention also provides for the connecting line between the two points of attachment of the haulage cable to the dung removal carriage to be situated only a small amount above the centre of gravity of the carriage. In consequence, when the laden dung removal carriage reaches the zone over the dung yard, it starts particularly rapidly and easily to perform rotary movements about the longitudinal axis extending through the points of attachment of the haulage cable.

In the case of the new manure removal plant, the invention further proposes that the haulage cable be located above the dung yard at a height which, until the dung yard is filled, permits the dung removal carriage to perform rotary movements above it. This arrangement of the haulage cable ensures that, until such times as the dung yard is filled, complete emptying and return of the dung removal carriage is possible.

For guiding the haulage cable at the exit from the animal shed and not impeding the exit of the carriage from the shed or the return thereof into the shed, the invention further provides that, at the exit from the stable, the haulage cable be passed over a jockey pulley which is adapted to be swung by means of a lever about a horizontal axis and within a limited angular range. This jockey pulley is pivoted outwardly when the dung removal carriage emerges from the stable and returns to it. Once the dung removal carriage has passed it, it then re-engages with the haulage cable.

For guiding the dung removal carriage after it has emerged from the stable and before it returns into the stable, the invention provides that, in the new manure removal plant, following on from the manure gutter and the exit from the stable, there is a ramp for the dung removal carriage which rises in the direction of the dung yard and which increases in width, its lateral edges being provided with upwardly extending edge parts.

In the case of the new manure removal plant, the invention furthermore suggests that, in the region of a haulage cable jockey pulley located after the dung yard, there be a limit switch, adapted to be actuated by the dung removal carriage, for reversing the haulage cable drive motor and that the haulage cable drive motor be switched off by a limit switch likewise actuated by the dung removal carriage and located at the inner end of the manure gutter. Thus, damage to the plant is avoided in the event of the dung removal carriage reaching the inner end of the manure gutter and the jockey pulley located at the rear of the dung yard without the haulage cable drive first being immobilised.

With regard to the attachment of the haulage cable to the dung removal carriage, the invention further provides for the cable to be secured to the front end of the dung removal carriage, at a point which is situated lower down than its point of attachment on the rear end of the dung removal carriage, and also provides for the point of attachment of the haulage cable on the front end of the dung removal carriage to be located slightly above the floor of the manure gutter. These features ensure that the part of the haulage cable extending from the front end of the dung removal carriage to the exit from the animal shed, while within the manure gutter, assumes a position which is fairly closely above the bottom thereof. This is advantageous for the pick-up of dung through the manure gutter and facilitates ingress of dung located in the manure gutter, into the dung removal carriage.

According to the invention, it is furthermore provided for the front end of the dung removal carriage to be of a lower height than the rear end. This construction is particularly favourable in that it facilitates entry of dung into the dung removal carriage from the manure gutter.

With regard to the construction of the dung removal carriage to consist of two or more parts in a longitudinally-spaced relationship to one another, being joined together by lateral articulating connecting means such as chains or the like. This construction facilitates the discharging of the dung entrained by the dung removal carriage, when this latter is situated above the dung yard.

Finally, according to the invention, various advantageous features are envisaged in respect of the special construction of the dung removal carriage for the new manure removal plant.

BRIEF DESCRIPTION OF THE DRAWINGS

The invention is illustrated by way of example in the attached drawings, in which:

FIG. 1 shows an animal shed or stable with an adjacent dung yard and with a dung removal plant, partly in vertical longitudinal section and partly in side elevation;

FIG. 2 shows the shed, the dung yard and the dung removal plant according to FIG. 1, partly in horizontal cross-section and partly in plan view;

FIG. 9 is a side view of a further dung removal carriage consisting of two parts;

FIG. 10 is an end elevation of the rear end of the same dung removal carriage and FIG. 11 is a plan view of the same dung removal carriage.

DESCRIPTION OF PREFERRED EMBODIMENTS

Figure 3:
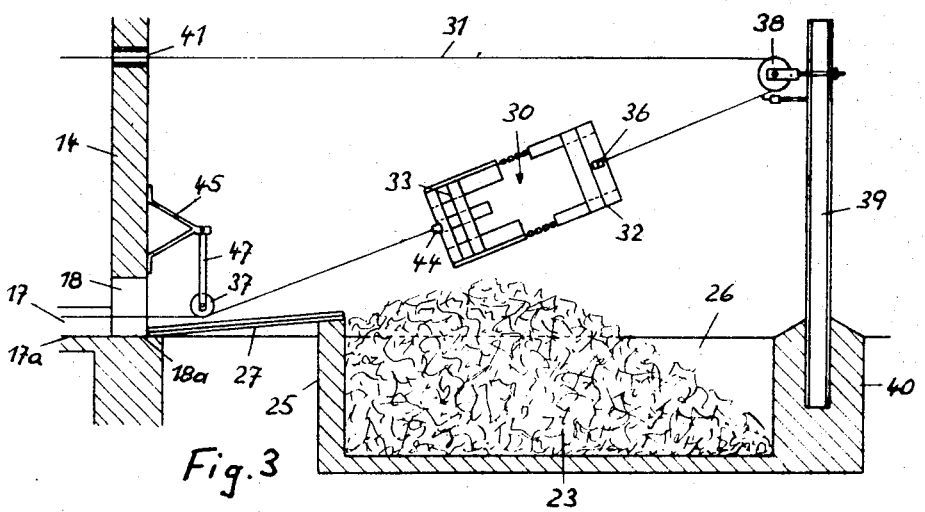
FIG. 3 shows a part of the shed, the dung yard and a part of the dung removal plant with a dung removal carriage located above the dung yard, partly in vertical longitudinal section and partly in side elevation.

The animal shed or stable 10 shown in FIGS. 1 to 3 has a floor 11, a ceiling 12, a rear end wall 13, a front end wall 14 and two side walls, of which however only one side wall 16 provided with windows 15, is shown. Provided approximately in the middle of the shed floor 11 is a manure gutter 17 which extends in the longitudinal direction of the shed 10 from its rear end wall 13 to its front end wall 14. Adjacent to the front end of the manure gutter 17, the front end wall 14 has an exit 18 of the same width as the manure gutter 17 but of approximately twice the height of the gutter 17, its bottom surface 18a lying in the same plane as the bottom surface 17a of the manure gutter 17.

On that side of the manure gutter 17 which is away from the window wall 16 is that part 19 of the shed floor 11 which serves as a livestock stand. The part 20 of the shed floor 11 which is located between the manure gutter 17 and the window wall 16, on the other hand, forms a corridor connected with door openings 21, 22 in the rear shed wall 13 and the front shed wall 14.

At some distance from the front end wall 14 of the shed 10 is a dung yard 23 which serves to receive the manure conveyed from the shed 10. The dung yard 23 has a base 24 and surrounding walls 25, 26 and 27, of which the lateral walls 26 and the enclosing wall 27 which is remote from the shed 10, extend approximately to the height of the ground while the wall 25 adjacent to the shed 10 projects somewhat above ground level. Adjacent to the exit 18 from the shed is a ramp 29 which extends from the shed exit 18 to the top edge of the wall 25 of the dung yard 23. The ramp 29 is formed by a bottom plate 28 and edge parts 29a extending alongside and upwardly of the lateral edges of the plate 28. The shed end of the plate 28 is on approximately the same plane as the floor surface 17a of the manure gutter and the bottom surface 18a of the exit 18. Furthermore, at that point it is of approximately the same width as the exit 18. From the shed exit 18, the ramp 29 rises in the direction of the dung yard 23, corresponding to the height of the wall 25 of the dung yard 23 and increases in width at the same time.

The dung removal plant shown in FIGS. 1 to 3 has a dung removal carriage 30 and a haulage rope 31.

The carriage 30 is preferably constructed in two parts and has a front portion or part 32 and a rear portion part 33 which are at an interval from each other in the longitudinal direction, being articulatingly joined by lateral chains 34, 35. In its dimensions and in particular its width and height, the dung removal carriage 30 corresponds to the manure gutter 17 in which it is capable of sliding back and forth.

The front end 31a of the haulage cable 31 is attached to a fixing member 36 on the front part 32 of the dung removal carriage. From the front part 32 of the carriage, the haulage rope 31 then, if the dung removal carriage 30 is inside the shed 10, extends along the manure gutter 17 and through the exit 18 to a jockey pulley 37 located to swing pendulum-fashion on the outside of the end wall 14 of the shed. From this jockey pulley 37, the haulage cable 31 extends upwardly over the dung yard 23 to a top jockey pulley 38 which is attached to a mast 39, the bottom end of which is housed in a socket 40 connected to the wall 27 of the dung yard 23.

Following the jockey pulley 38, the haulage cable 31 is guided in a horizontal direction through an aperture 41 in the top of the end wall 14 of the shed, passing into the interior of the shed, where it extends to the drive pulley of a reversible drive motor 42 which is secured to the ceiling 12 of the shed. The haulage cable 31 passed completely around the drive pulley of the motor 42 after which it runs on to a jockey pulley 43 secured to the inside face of the end wall 13 of the shed, in the vicinity of the manure gutter 17. From this jockey pulley 43, finally, the haulage cable 31 is extended to the rear part 33 of the dung removal carriage 30, its rear end 31b being attached to a fixing member 44 on the rear part 33 of the carriage.

For attaching the swinging jockey pulley 37 located at the exit from the shed, supporting struts 45, 46 are used, these being mounted on the outer face of the end wall 14 of the shed. Furthermore, a pivoting arm 47 is provided which is adapted to pivot within a limited angular range about a horizontal transverse axle 48 carried by the supporting struts 45, 46, as shown in FIG. 2. The jockey pulley 37 is disposed for free rotation on the bottom end of the arm 47.

The top jockey pulley 38 is secured to the mast 39 by means of tension bracket 49. The arms 50 of this tension bracket 49 carry an axle 51 on which the jockey pulley 38 is rotatably mounted. Engaging on the web 52 of the tension bracket 49 are two fixing screws 53 which extend through apertures located in the mast 39 and which carry on their ends a fixing nut 54, by means of which it is possible to vary the distance between the tension bracket 49 and the mast 39 and so vary the tension in the haulage cable 31.

The drive motor 42 for the haulage cable 31 is enclosed by a housing 55 by which it is secured to the ceiling 12 of the animal shed or stable.

The inner jockey pulley 43 is held by a bracket 56, being thereby mounted for rotation on an axle 58 extending horizontally through the arms 57 of this bracket 56. The bracket 56 and hence the jockey pulley 43 are secured to the end wall 13 of the shed by an anchoring bolt 59 which extends through the web 60 of the bracket 56 into the interior of the end wall 13.

In order for the drive motor 42 for the haulage cable 31 to be switched on and off, a switch 61 is provided on the inside of the end wall 13. Furthemore, for reversing the drive motor 42, there is provided on the mast 39, in the region of the outer top jockey pulley 38, a limit switch 62a which is actuated by the dung removal carriage 30 when the front part 32 thereof reaches the jockey pulley 38. Furthermore, another limit switch 62b for switching off the drive motor 42 is located at the inner end of the manure gutter 17. This limit switch 62b is actuated by the dung removal carriage 30 when the rear part 33 thereof, during return movement into the shed 10, reaches the jockey pulley 43 located on the end wall 13 of the shed.

Figures 4, 5:
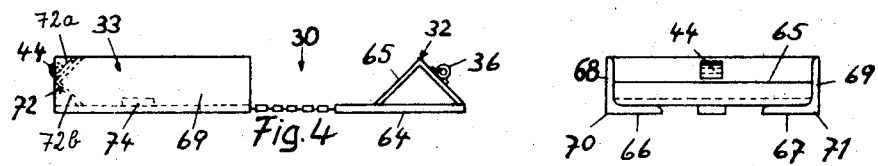
FIG. 4 shows the dung removal carriage consisting of two parts and forming part of the dung removal plant according to FIGS. 1 to 3, in side view.
FIG. 5 is an end elevation of the rear end of the dung removal carriage shown in FIG. 4.
Figure 6:
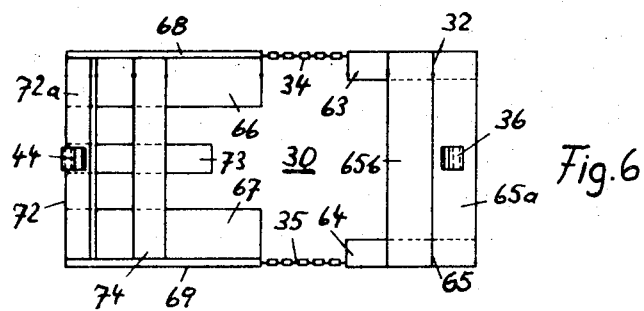
FIG. 6 is a plan view of the same dung removal carriage.

The dung removal carriage 30 is illustrated on an enlarged scale in FIGS. 4 to 6.

The front part 32 of the dung removal carriage 30 has two lateral skids 63, 64 extending in a longitudinal direction and formed by flat iron members. Furthermore, the front carriage part 32 has an angle plate 65 disposed on the skids 63, 64 in the transverse direction with its angle pointing upwardly. The angle plate 65 has a front wall 65a and a rear wall 65b which are located at an angle of 90° to each other. Located centrally in the top part of the front wall 65a of the angle plate 65 is the fixing member 36 for the front end 31a of the haulage cable 31. The chains 34, 35 serving to connect the front part 32 of the carriage 30 to the rear part 33 thereof are secured to the rear ends of the skids 63, 64.

The rear part 33 of the dung removal carriage 30 likewise has two longitudinally extending lateral skids 66, 67. Adjacent to the lateral edge of these skids 66, 67 are upwardly-directed side walls 68, 69. The skid 66 and the side wall 68, as well as the skid 67 and the side wall 69 are thereby formed by two angle profile members 70, 71. In addition, the rear carriage part 33 also has, at its rear end, an angle plate 72 on the skids 66, 67 and between the side walls 68, 69. The angle of this angle plate 72 is directed to the rear and it has an upper wall 72a and a lower wall 72b located at an angle of 90° to each other. Disposed in the centre of the upper wall 72a is the fixing member 44 to take the rear end 31b of the haulage rope 31. For reinforcing purposes and to accommodate dung, the rear part 33 of the carriage also has an additional central longitudinal skid 73 and a transverse strut 74 disposed at some distance from the angle plate 72 on the skids 66, 67 and 73. Finally, the chains 34, 35 which serve to connect the rear part 33 of the carriage to the front part 32 are attached to the front end of the skids 66, 67 on the rear part 33.

When the dung removal plant according to FIGS. 1 to 3 is not in operation, the dung removal carriage 30 is in the starting position shown in FIGS. 1 and 2, inside the manure gutter 17 and at the inner end thereof. When the time comes to remove from the shed 10 dung which has fallen into the manure gutter 17 or which has been pushed into that gutter, the driving motor 42 of the haulage cable 31 is switched on by means of the switch 61. The dung removal carriage 30 is then pulled by the haulage cable 31 through the manure gutter 17 in the direction of the exit 18. As this happens, dung located in the gutter 17 is entrained by the carriage 30, for the most part being passed into the space located between the two parts 32, 33 of the carriage.

After reaching the exit 18, the dung removal carriage 30 is withdrawn from the shed 10 by the haulage cable 31, moving along the ramp 29 and under the swingingly mounted jockey pulley 37. In order to allow the carriage 30 to pass under it, the jockey pulley 37 executes a pivoting movement in the direction of the dung yard 23.

When the carriage 30 has passed the pulley 37, it is raised by the haulage cable 31, in accordance with its obliquely upward disposition, from the ramp 29 and is moved into a position above the dung yard 23, as indicated in FIG. 3. After the dung removal carriage 30 has passed, the jockey pulley 37 swings back into the direction of the shed 10, re-engaging thereby with the haulage cable 31.

According to the extent to which the dung yard 23 has already been filled, some of the dung entrained by the dung removal carriage 30 may, as the carriage 30 moves upwards over the dung yard 23, be discharged immediately after the carriage has been lifted off the ramp 29 or not until somewhat later from the carriage into the dung yard 23. If, during its upward movement over the dung yard 23, the dung removal carriage 30 has reached the position in which it can execute rotary movements, the drive motor 42 is switched off. Since, as a rule, the dung removal carriage 30 is not evenly loaded with dung, it then performs complete rotary movements about the axis extending through its fixing members 36, 44 for the haulage cable 31. During these rotary movements, the remaining dung entrained by the dung removal carriage 30 falls into the dung yard 23.

After discharge of the dung by the dung removal carriage 30, the centre of gravity of the carriage causes it to pivot back into its normal position. Then the drive motor 42 is switched on again but runs in the opposite direction. Consequently, the carriage 30 is returned by the haulage cable 31 in the direction of the shed 10. While this is happening, it passes back onto the ramp 29 and within reach of the swingingly disposed jockey pulley 37. In order to allow the carriage 30 to enter the shed 10, the jockey pulley 37 swings in the direction of the shed 10.

The haulage cable 31 thereupon draws the dung removal carriage 30 under the pulley 37 and through the exit 18 into the manure gutter 17 of the shed. After the carriage 30 has passed, the jockey pulley 37 again swings back into its normal position and re-engages with the haulage cable 31. The dung removal carriage 30 is then finally moved by the haulage cable 31 back to its starting position along the manure gutter 17. Once this starting position has been reached, the limit switch 52b switches off the drive motor 42.

Figure 7:
FIG. 7 is a side view of a dung removal carriage consisting of three parts.
Figure 8:
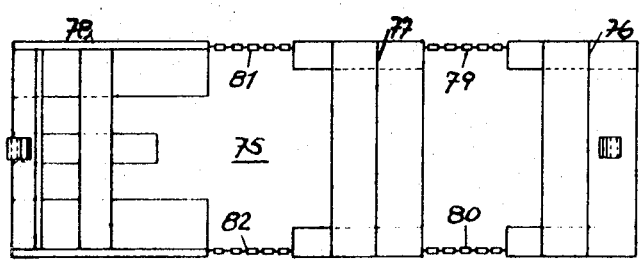
FIG. 8 is a plan view of the same dung removal carriage.

The dung removal carriage 75 illustrated in FIGS. 7 and 8 has a front part 76, a middle part 77 and a rear part 78 which are located at a distance from one another. The front carriage part 76 and the middle carriage part 77 are articulatingly connected by lateral chains 79, 80 and the rear carriage part 78 and the middle carriage part 77 are articulatingly connected by lateral chains 81, 82.

The front carriage part 76 and the rear carriage part 78 of the carriage 75 correspond exactly to the front carriage part 32 and the rear carriage part 33 of the dung removal carriage 30. With regard to the middle carriage part 77 of the carriage 75, the construction of this is in accordance with that of the front part 76, with the exception of the fact that its angle plate does not have a fixing member for attachment of the haulage cable 31.

The mode of operation of a dung removal plant equipped with a dung removal carriage 75 as shown in FIGS. 7 and 8 corresponds exactly to that described with regard to the dung removal plant in FIGS. 1 to 3. The difference resides solely in the fact that the dung removal carriage 75 is constructed in three parts and consequently is capable of accommodating more dung than the two part dung removal carriage 30.

The dung removal carriage 83 shown in FIGS. 9 to 11 is constructed in two parts and has a front part 84 and a rear part 85 which are spaced in a longitudinal direction from each other, being articulatingly connected by lateral chains 86, 87. In its width, the dung removal carriage 83 corresponds to the manure gutter 17. The height of the dung removal carriage 83 on the other hand is somewhat less than that of the manure gutter 17. The front part 84 of the carriage 83 has a substantially smaller height than its rear part 85.

The front part 84 of the dung removal carriage 83 has two longitudinally extending lateral skids 88, 89 constituted by flat iron members. Furthermore, the front carriage part 84 has a front angle plate 90, which is arranged in a transverse direction on the skids 88, 89 on the front end thereof, the angle of which is directed upwardly. The angle plate 90 has a front wall 90a and a rear wall 90b which are at an angle of 90° to each other. Disposed approximately halfway up the front wall 90a of the angle plate 90 and centrally thereon is a fixing member 91 for attachment of the front end 31a of the haulage cable 31. In addition, the front part 84 of the dung removal carriage 83 has two vertical side panels 92, 93 which likewise extend in a longitudinal direction being disposed on the skids 88, 89, laterally of the angle plate 90.

The chains 86, 87 which serve to connect the front part 84 of the carriage to the rear part 85 are secured to the rear ends of the skids 88, 89 of the front carriage part 84.

The rear part 85 of the dung removal carriage 83 likewise has two longitudinally extending lateral skids 94, 95. The skids 94, 95 consist of angle profile members from which one arm extends vertically upwardly on the lateral edge of the skids 94, 95. The lateral skids 94, 95 furthermore have at their rear end an obliquely rearwardly and upwardly-directed angled part 94a, 95a. Disposed on the rear upper ends of the angled skid parts 94a, 95a is an angle plate 96. The disposition of the angle plate 96 is such that its angle is directed rearwardly. It is likewise formed by an angle profile and has an upper wall 96a and a lower wall 96b which are at an angle of 90° to each other. On the rear edge formed by the two walls 96a, 96b of the angle plate 96, provided centrally thereon, is a fixing member 97 for attachment of the rear end 31b of the haulage cable 31.

For reinforcement purposes and to accommodate dung, the rear part 85 of the dung removal carriage 83 also has a transverse web 98 located in front of the angled skid parts 94a, 95a and extending from the skid 94 to the skid 95. To improve pick-up of dung and for reliable guiding of the dung removal carriage 83, the rear carriage part 85 is furthermore equipped with a middle longitudinal skid 99 consisting of a flat iron member and extending forwardly from the transverse web 98. For purposes of strengthening the disposition of the middle longitudinal skid 99 and transverse web 98, a strengthening strip 100 is also provided, extending along the upper side of the middle longitudinal skid 99 over the transverse web 98 to the angle plate 96. Finally, the rear part 85 of the carriage is also equipped with two side walls 101, 102 disposed on the upper edge of the vertical parts of the lateral skids 94, 95, and extending approximately as far as the upper edge of the top wall 96a of the angle plate 96.

For connection of the rear carriage part 85 to the connecting chains 86, 87, these latter are attached to the front ends of the skids 94, 95.

The manner in which a dung removal plant, equipped with a dung removal carriage according to FIGS. 9 to 11, operates likewise corresponds to that which was described in respect of the dung removal plant shown in FIGS. 1 to 3. By virtue of the low height of the front part 84 of the dung removal carriage 83 and the correspondingly low arrangement of the front end 31a of the haulage cable 31, a dung removal plant equipped with a dung removal carriage 83 differs advantageously from the dung removal plant of FIGS. 1 to 3 in that the part of the haulage cable 31 located between the dung removal carriage 83 and the shed exit 18 virtually represents no obstacle to the pick-up of dung by the manure gutter 17, and in that the dung is even better able to pass from the manure gutter 17 into the dung removal carriage 83.

While various embodiment have been illustrated and described in some detail, it is apparent that other variations and changes may be made by those skilled in the art without departing from the spirit and scope of the invention as defined in the appended claims.

What I claim is:

1. A manure removal plant or system embodying a self-emptying dung removal carriage slidable along a manure gutter of a shed or the like and subsequently movable obliquely upwardly and suspensionably over a dung yard adjacent a shed exit, said system comprising in combination:
   (a) a low-profile dung removal carriage of basically generally planar form primarily utilizing the major plane thereof to support said dung, and having opposed front and rear end portions;
   (b) means mounting a single haulage cable for reversible movement, said cable having its opposite ends connected to said carriage under relatively high tension when in operation and with a connecting line therebetween at only a relatively small distance above the major plane and center of gravity of said carriage;
   (c) said cable ends being connected at opposed front and rear end portions of said carriage on a longitudinal axis thereof so that in operation said cable is generally parallel to said major plane of said carriage;
   (d) said carriage portions at which said cable ends are connected thereto being disposed at said height on said carriage so that a straight line between the connecting points is above its center of gravity whereby the dung-laden carriage when loaded inherently unbalances the carriage and when suspended over said dung yard automatically rotates about said carriage's longitudinal axis to consequently effect gravity self-discharge thereof, and when emptied becomes self-righting due to the relative relationship of said cable carriage connections and center of gravity thereof; and
   (e) reversible drive means operatively connectable with and for moving said cable and carriage forwardly and backwardly in said gutter and over said dung yard.

2. A system as defined in claim 1 wherein said haulage cable is disposed above the dung yard at a height allowing complete rotations of said carriage until the dung yard becomes filled.

3. A system as defined in claim 1 wherein said cable guiding means includes a first jockey pulley, an arm on which the pulley is mounted, and means for mounting the arm for limited swinging movement of the first pulley about a horizontal axis at a location between the gutter and the dung yard.

4. A system as defined in claim 1, further comprising a ramp disposed between said gutter and said dung yard, said ramp being inclined upwardly in a direction away from said gutter.

5. A system as defined in claim 4 in which said ramp is of increasing width in a direction away from said gutter.

6. A system as defined in claim 4 wherein said ramp has upwardly directed lateral edge parts.

7. A system as defined in claim 1 additionally including a first limit switch disposed at or near the end of the gutter remote from said dung yard and a second limit switch disposed adjacent said dung yard at a location remote from said gutter, said first limit switch being further arranged for actuation by said carriage for stopping the drive means, and said second limit switch being disposed for actuation by said carriage for reversing the drive means.

8. A system as defined in claim 1 in which the said carriage connection at the said front end portion is disposed at a lower level than that at the said rear end portion, and said front end connection being disposed a small distance above the gutter floor when the carriage is in the gutter.

9. A system as defined in claim 1 in which the rear end portion of the carriage is higher than the front end portion of the carriage.

10. A system as defined in claim 1 in which the carriage is formed of a front part and a separate rear part spaced along said longitudinal axis, and additionally including flexible connecting means for articulatedly connecting the said front part and said rear part.

11. A system as defined in claim 10 in which the said front part comprises two parallel spaced skids extending in the direction of the said longitudinal axis and a transverse angle plate having a front wall and a rear wall joined at an apex and connecting the skids, said angle plate having its apex directed upwardly and being provided at its front wall with a fixing member mounted in the front wall and connected to the haulage cable, said connecting means being connected to rear end portions of said respective skids.

12. A system as defined in claim 10 wherein said carriage rear part includes two parallel spaced skids extending in the direction of said longitudinal axis, two parallel spaced and upwardly extending walls each mounted on the lateral edge of a respective skid, and a transverse angle plate connecting the skids, said angle plate having two sides joined at an apex directed rearwardly and being provided at its rear side with a fixing member to which one end of said haulage cable is connected, said connecting means being connected to front end portions of said respective skids.

13. A system as defined in claim 11 in which said rear end portion of each skid is rearwardly upwardly directed, the said angle plate being connected to the respective rear ends of the said rear end portions.

14. A system as defined in claim 10 wherein said carriage further comprises at least one intermediate part connected between and spaced from said front and rear carriage parts by flexible connecting means extending forwardly from said intermediate part and connected to said front part, and other flexible connecting means extending rearwardly from said intermediate part and connected to said rear part.

15. A system as defined in claim 13 wherein said carriage additionally includes an intermediate part identical in construction to said front part and connected between the front and rear parts by flexible means.

16. A system as defined in claim 10 wherein said flexible connecting means comprises chain means.

17. A system as defined in claim 14 wherein said flexible connecting means comprises chain means.

References Cited

UNITED STATES PATENTS

| | | | |
|---|---|---|---|
| 2,303,649 | 12/1942 | Livingston | 198—224 UX |
| 1,668,815 | 5/1928 | Livingston | 198—DIG. 18 |
| 2,831,274 | 4/1958 | Addicks | 198—224 X |
| 3,100,043 | 8/1963 | Cordis | 198—224 |
| 2,552,743 | 5/1951 | Simpson | 198—224 |
| 3,240,323 | 3/1966 | Kitson | 198—224 |
| 1,711,004 | 4/1929 | Youngman | 198—DIG. 18 |
| 2,529,777 | 11/1950 | McInnis | 198—135 |

EVON C. BLUNK, Primary Examiner

D. D. WATTS, Assistant Examiner

U.S. Cl. X.R.

198—DIG 18